United States Patent
Chauhan et al.

(10) Patent No.: US 11,455,571 B2
(45) Date of Patent: Sep. 27, 2022

(54) DATA STRUCTURE TOOL

(71) Applicant: Bank of America Corporation, Charlotte, NC (US)

(72) Inventors: Sandeep Kumar Chauhan, Hyderabad (IN); Srinivasa Rao Dakshinyam, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 724 days.

(21) Appl. No.: 16/442,221

(22) Filed: Jun. 14, 2019

(65) Prior Publication Data

US 2020/0394555 A1 Dec. 17, 2020

(51) Int. Cl.
*G06N 20/00* (2019.01)
*G06F 16/13* (2019.01)

(52) U.S. Cl.
CPC ............ *G06N 20/00* (2019.01); *G06F 16/13* (2019.01)

(58) Field of Classification Search
CPC ....... G06N 20/20; H04L 63/1416; G06F 8/73; G06F 9/45512; G06F 16/84
See application file for complete search history.

(56) References Cited

U.S. PATENT DOCUMENTS

| | | | |
|---|---|---|---|
| 6,757,262 B1 | 6/2004 | Weisshaar | |
| 6,957,199 B1 | 10/2005 | Fisher | |
| 7,047,535 B2 | 5/2006 | Lee et al. | |
| 7,065,579 B2 | 6/2006 | Traversat | |
| 7,114,146 B2 | 9/2006 | Zhang | |
| 7,165,107 B2 | 1/2007 | Pouyoul | |
| 7,181,442 B2 | 2/2007 | Yeh | |
| 7,412,518 B1 | 8/2008 | Duigou | |
| 7,467,203 B2 | 12/2008 | Kang | |
| 7,483,693 B2 | 1/2009 | Lueng | |
| 7,529,833 B2 | 5/2009 | Cai | |
| 7,543,052 B1 | 6/2009 | Cesa Klein | |
| 7,664,081 B2 | 2/2010 | Luoma | |
| 7,676,472 B2 | 3/2010 | Kurhekar et al. | |
| 7,676,539 B2 | 3/2010 | Jhoney | |
| 7,698,398 B1 | 4/2010 | Lai | |
| 7,822,860 B2 | 10/2010 | Brown | |
| 7,831,693 B2 | 11/2010 | Lai | |
| 7,962,470 B2 | 7/2011 | Degenkolb et al. | |
| 7,987,163 B2 | 7/2011 | Keshavarz-Nia | |
| 8,069,943 B2 | 12/2011 | Takahashi | |
| 8,086,758 B1 | 12/2011 | Allan et al. | |
| 8,271,998 B2 | 9/2012 | Dettori et al. | |

(Continued)

*Primary Examiner* — Saba Dagnew

(57) ABSTRACT

An apparatus includes a database and a processor. The database stores a set of services, each of which produces outputs when provided inputs. The processor determines a machine learning policy that can be applied to a first service to determine a descriptor file assigned to the service. The first service can produce a first output when provided a first input. The descriptor file includes the first output type and the first input type. The processor applies the machine learning policy to the set of services to determine a set of descriptor files. The processor receives a request from a user for a second service that produces a second output given a second input. The processor then locates a second descriptor file that includes the second output type and the second input type, determines a third service assigned to the descriptor file, and sends the third service to the user.

20 Claims, 7 Drawing Sheets

(56) References Cited

U.S. PATENT DOCUMENTS

| | | |
|---|---|---|
| 8,346,929 B1 | 1/2013 | Lai |
| 8,549,471 B2 | 10/2013 | Jung et al. |
| 8,645,276 B2 | 2/2014 | Wong |
| 8,793,359 B1 | 7/2014 | Fiebig et al. |
| 8,819,219 B2 | 8/2014 | Vandwalle |
| 9,036,509 B1 | 5/2015 | Addepalli |
| 9,396,091 B2 | 7/2016 | Bally et al. |
| 9,778,924 B2 | 10/2017 | Batabyal et al. |
| 2003/0140119 A1 | 7/2003 | Acharya et al. |
| 2004/0111525 A1 | 6/2004 | Berkland |
| 2005/0080768 A1 | 4/2005 | Zhang |
| 2005/0097087 A1 | 5/2005 | Punaganti Venkata et al. |
| 2006/0034256 A1 | 2/2006 | Addagatla |
| 2008/0005752 A1* | 1/2008 | Morris ............... G06F 9/45512 719/331 |
| 2008/0140759 A1 | 6/2008 | Conner |
| 2008/0271008 A1 | 10/2008 | Dettori et al. |
| 2009/0300054 A1* | 12/2009 | Fisher .................. G06F 16/84 707/999.102 |
| 2012/0136944 A1 | 5/2012 | Stewart |
| 2012/0158931 A1 | 6/2012 | Ohlman et al. |
| 2017/0251013 A1* | 8/2017 | Kirti ................ H04L 63/1441 |
| 2018/0075139 A1* | 3/2018 | Sadovsky ............ G06N 20/20 |
| 2019/0079754 A1* | 3/2019 | Makkar .................. G06F 8/73 |

\* cited by examiner

DATA STRUCTURE TOOL

TECHNICAL FIELD

This disclosure relates generally to data structures.

BACKGROUND

Organizations frequently develop data structures to enable efficient access and modification of the data stored in their systems. For example, an organization may develop a customer data structure, which is associated with a customer ID, and used to store and access a customer name, a customer address, and a customer credit card number in the organization's system. The organization may then use the customer data structure to access the customer name, customer address, and customer credit card number assigned to a given customer ID, without having to request each piece of information separately.

SUMMARY

Organizations frequently develop data structures to enable efficient access and modification of the data stored in their systems. For example, an organization may develop a customer data structure, which is associated with a customer ID, and used to store and access a customer name, a customer address, and a customer credit card number in the organization's system. The organization may then use the customer data structure to access the customer name, customer address, and customer credit card number assigned to a given customer ID, without having to request each piece of information separately.

When an organization seeks to implement a new data structure within its system, it may need to devote significant resources to developing and testing the data structure to help ensure that it is fit for use within the organization. At the same time, many organizations store similar types of data within their systems. Therefore, rather than implementing a new data structure from scratch, it may be possible for a given organization to obtain the data structure from another organization that has already expended time and effort developing and testing the data structure. However, given the time it may take to locate a suitable data structure implemented by one of the various other organizations, it may be more efficient for the organization simply to develop and test the new data structure itself.

This disclosure contemplates a data structure tool that addresses one or more of the above issues. The tool uses a machine learning algorithm to generate a set of descriptor files, each of which is assigned to a data structure implemented by a given organization. Each descriptor file specifies the types of outputs returned by its associated data structure, in response to receiving given input types. For example, a descriptor file for the customer data structure described above may indicate that the data structure returns a name formatted as a string, an address formatted as a string, and a credit card number formatted as an integer in response to receiving a customer ID formatted as a string. The tool then stores the set of descriptor files in a database, for easy access. When the tool receives a request from a user seeking to implement a data structure that returns given output types in response to receiving given input types into his/her system, the tool searches the database for a descriptor file that contains the given input types and output types. The tool then determines to which data structure the descriptor file is assigned and sends the data structure to the user.

In addition to data structures, this disclosure contemplates that the data structure tool may operate on any type of application programming interface (API) that provides a service to a user (including a customer of an organization) by generating a response (output) when provided with a request (input). Accordingly, the remainder of this disclosure refers to the operation of the tool on a set of "services" provided by various organizations, where the services contemplated include not only data structures, but also any other types of APIs offered by the organizations. Certain embodiments of the data structure tool are described below.

According to one embodiment, an apparatus includes a first database, a second database, and a hardware processor. The first database stores a set of services. Each service of the set of services includes a source code file and a piece of metadata. The source code file and the piece of metadata define a set of input parameters and a set of output parameters. Each service of the set of services is configured to produce the set of output parameters in response to receiving the set of input parameters. The processor uses a first subset of the set of services to determine a machine learning policy. The machine learning policy can be applied to a first service of the set of services to determine a descriptor file assigned to the first service. Here, the first service is configured to produce a first output parameter in response to receiving a first input parameter. Applying the machine learning policy to the first service includes determining a first output type assigned to the first output parameter and determining a first input type assigned to the first input parameter. The descriptor file includes the first output parameter type and the first input parameter type. The processor further applies the machine learning policy to the set of services to determine a set of descriptor files. Each descriptor file of the set of descriptor files is assigned to a service of the set of services. The processor also stores the set of descriptor files in the second database. The processor additionally receives a request from a user for a second service. The second service is configured to produce a second output parameter given a second input parameter. The second output parameter is assigned to a second output type and the second input parameter is assigned to a second input type. In response to receiving the request from the user for the second services, the processor locates a second descriptor file of the set of descriptor files that includes the second output type and the second input type. The processor further determines a third service assigned to the second descriptor file and sends the third service to the user.

According to another embodiment, a method includes using a first subset of a set of services to determine a machine learning policy. The machine learning policy can be applied to a first service of the set of services to determine a descriptor file assigned to the first service. Here, each service of the set of services includes a source code file and a piece of metadata. The source code file and the piece of metadata define a set of input parameters and a set of output parameters. Each service of the set of services is also configured to produce the set of output parameters in response to receiving the set of input parameters. For example, the first service is configured to produce a first output parameter in response to receiving a first input parameter. Applying the machine learning policy to the first service includes determining a first output type assigned to the first output parameter and determining a first input type assigned to the first input parameter. The descriptor file includes the first output parameter type and the first input parameter type. The method further includes applying the machine learning policy to the set of services to determine a set of descriptor files. Each descriptor file of the set of descriptor files is assigned to a service of the set of services. The method also includes storing the set of descriptor files in a database. The method additionally includes receiving a request from a user for a second service that is configured to produce a second output parameter given a second input parameter. The second output parameter is assigned to a second output type and the second input parameter is assigned to a second input type. In response to receiving the request from the user for the second service the method includes locating a second descriptor file of the set of descriptor files. The second descriptor file includes the second output type and the second input type. The method further includes determining a third service assigned to the second descriptor file and sending the third service to the user.

According to a further embodiment, a system includes a first storage element, a second storage element, and a processing element. The first storage element is operable to store a set of services. Each service of the set of services includes a source code file and a piece of metadata. The source code file and the piece of metadata define a set of input parameters and a set of output parameters. Each service of the set of services is configured to produce the set of output parameters in response to receiving the set of input parameters. The processing element is operable to use a first subset of the set of services to determine a machine learning policy. The machine learning policy can be applied to a first service of the set of services to determine a descriptor file assigned to the first service. Here, the first service is configured to produce a first output parameter in response to receiving a first input parameter. Applying the machine learning policy to the first service includes determining a first output type assigned to the first output parameter and determining a first input type assigned to the first input parameter. The descriptor file includes the first output parameter type and the first input parameter type. The processing element is further operable to apply the machine learning policy to the set of services to determine a set of descriptor files. Each descriptor file of the set of descriptor files is assigned to a service of the set of services. The processing element is also operable to store the set of descriptor files in the second storage element. The processing element is additionally operable to receive a request from a user for a second service. The second service is configured to produce a second output parameter given a second input parameter. The second output parameter is assigned to a second output type and the second input parameter is assigned to a second input type. In response to receiving the request from the user for the second services, the processing element is operable to locate a second descriptor file of the set of descriptor files that includes the second output type and the second input type. The processing element is further operable to determine a third service assigned to the second descriptor file and send the third service to the user.

Certain embodiments provide one or more technical advantages. For example, an embodiment provides an organization with reliable data structures and other services that have undergone thorough testing. As another example, an embodiment enables an organization to conserve valuable resources by implementing existing services rather than developing the services from scratch. As a further example, an embodiment enables efficient sharing of services amongst organizations and customers. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
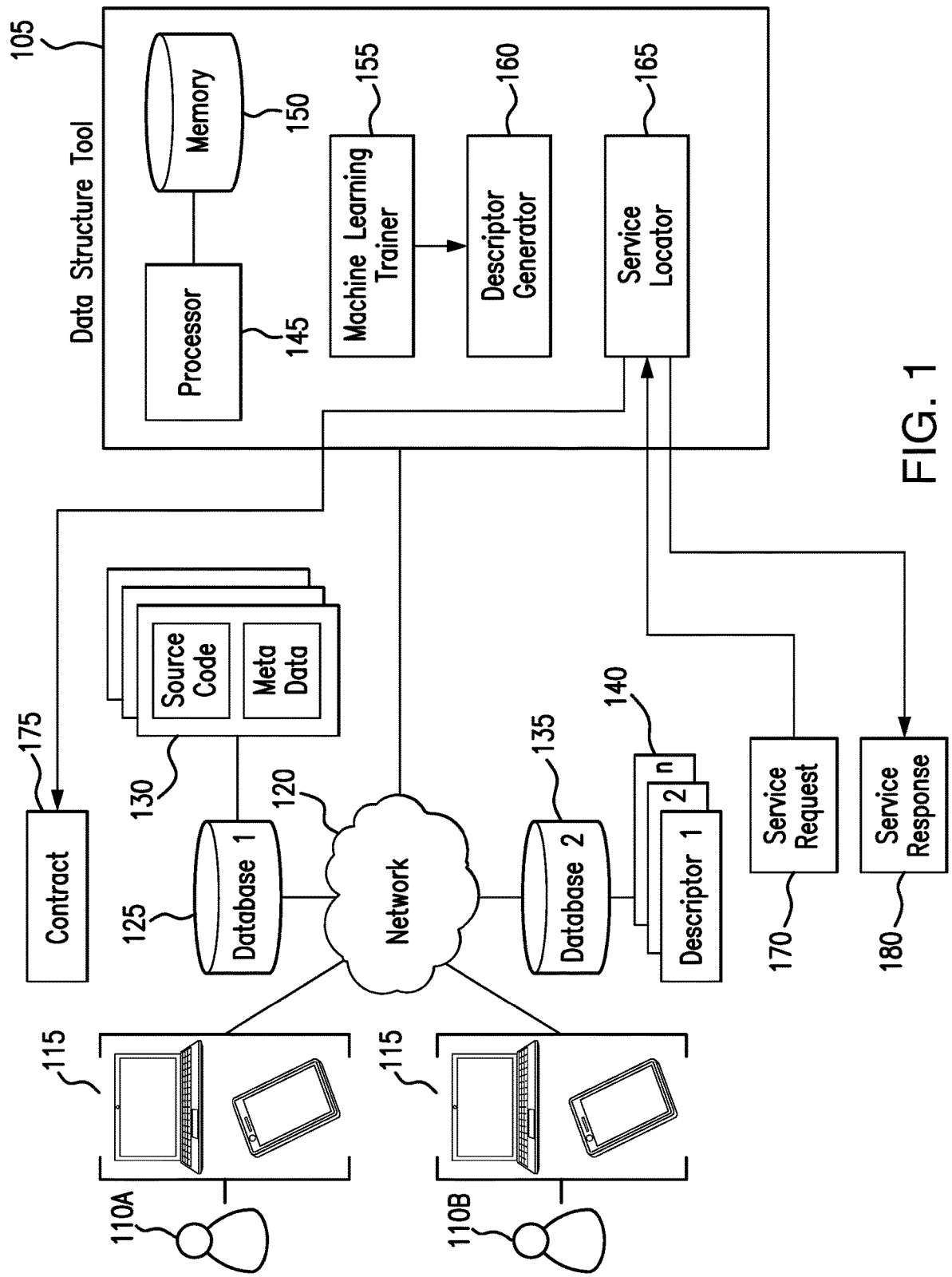
FIG. 1 illustrates an example system.

Embodiments of the present disclosure and its advantages are best understood by referring to FIGS. 1 through 7 of the drawings, like numerals being used for like and corresponding parts of the various drawings.

Organizations frequently develop data structures to enable efficient access and modification of the data stored in their systems. For example, an organization may develop a customer data structure, which is associated with a customer ID, and used to store and access a customer name, a customer address, and a customer credit card number in the organization's system. The organization may then use the customer data structure to access the customer name, customer address, and customer credit card number assigned to a given customer ID, without having to request each piece of information separately.

When an organization seeks to implement a new data structure within its system, it may need to devote significant resources to developing and testing the data structure to help ensure that it is fit for use within the organization. At the same time, many organizations store similar types of data within their systems. Therefore, rather than implementing a new data structure from scratch, it may be possible for a given organization to obtain the data structure from another organization that has already expended time and effort developing and testing the data structure. However, given the time it may take to locate a suitable data structure implemented by one of the various other organizations, it may be more efficient for the organization simply to develop and test the new data structure itself.

This disclosure contemplates a data structure tool that addresses one or more of the above issues. The tool uses a machine learning algorithm to generate a set of descriptor files, each of which is assigned to a data structure implemented by a given organization. Each descriptor file specifies the types of outputs returned by its associated data structure, in response to receiving given input types. For example, a descriptor file for the customer data structure described above may indicate that the data structure returns a name formatted as a string, an address formatted as a string, and a credit card number formatted as an integer in response to receiving a customer ID formatted as a string. The tool then stores the set of descriptor files in a database, for easy access. When the tool receives a request from a user seeking to implement a data structure that returns given output types in response to receiving given input types into his/her system, the tool searches the database for a descriptor file that contains the given input types and output types. The tool then determines to which data structure the descriptor file is assigned and sends the data structure to the user.

In addition to data structures, this disclosure contemplates that the data structure tool may operate on any type of application programming interface (API) that provides a service to a user by generating a response (output) when provided with a request (input). Accordingly, the remainder of this disclosure refers to the operation of the tool on a set of "services" provided by various organizations, where the services contemplated include not only data structures, but also any other types of APIs offered by the organizations. The data structure tool will be described in more detail using FIGS. 1 through 7.

FIG. 1 illustrates an example system 100. As seen in FIG. 1, system 100 includes data structure tool 105, users 110, devices 115, network 120, first database 125 and second database 135. Generally, data structure tool 105 uses a machine learning algorithm to generate a set of descriptor files 130, each of which is assigned to a service of the set of services 130. The set of services 130 includes any type of application programming interface (API) that produces outputs (responses) in response to receiving inputs (requests), including APIs that implement data structures. Each descriptor file is assigned to a service and specifies the types of outputs and the types of inputs associated with the service. Data structure tool stores the set of descriptor files 130 in second database 135, for later use. When data structure tool receives a request 170 from a user 110B seeking to implement a service that returns given output types in response to receiving given input types into his/her system, the tool searches database 125 for a descriptor file that contains the given input types and output types. The tool then determines to which service the descriptor file is assigned and sends the service to user 110B.

In the example of FIG. 1, user 110A belongs to an organization that creates and offers services that may be used by other individuals and/or organizations, while user 110B is an individual or member of another organization seeking to use a service provided by the organization to which user 110A belongs.

Devices 115 are used by users 110B to send requests 170 seeking services that may be stored in first database 125 to data structure tool 105. Devices 115 are also used by users 110B to receive responses 180 sent by data structure tool 105 to users 110B when data structure tool 105 determines that a service requested by user 110B is in fact stored in first database 125. In certain embodiments, responses 180 include the service that data structure tool 105 located in first database 125. In certain embodiments, sending a response 180 to a user 110B includes creating a contract between user 110B and the organization that developed the service. In such embodiments, devices 115 are additionally used by users 110A to receive contract information 175.

Devices 115 include any appropriate device for communicating with components of system 100 over network 120. For example, devices 115 may be a telephone, a mobile phone, a computer, a laptop, a tablet, a server and/or an automated assistant. This disclosure contemplates devices 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110A or 110B. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 125 stores a set of services 130. Each service of the set of services 130 contains both source code and metadata that define the service. This disclosure contemplates that a service of the set of services can include any type of application programming interface (API) that generates outputs (responses) in response to receiving inputs (requests). As an example, a service may specify a data structure. For example, an organization may develop a customer data structure, which provides a customer name, customer address, and customer credit card number in response to receiving a customer ID. For simplicity, FIG. 1 illustrates a single first database 125. However, this disclosure contemplates that data structure tool 105 may operate on any number of first databases 125. For example, system 100 may include first databases 125 belonging to several separate organizations, with a different first database 125 assigned to each organization. As another example, one first database 125 may store services that an organization is currently developing, while a second first database 125 may store services for which the development process is complete.

Second database 135 stores a set of descriptor files 140 generated by data structure tool 105. Each descriptor file 140 contains metadata that describes the purpose for which the service described by the descriptor file can be used, in plain, natural language. This includes a natural language description of the input types and output types of the services. When a user 110B sends a request 170 for a service stored in the set of services 130 to data structure tool 105, the tool may then search the set of descriptor files 140 to determine whether the service exists. For example, a user 110B may send a request 170 for a service that takes a customer ID as input and returns a customer name and address, both formatted as strings, in response. Data structure tool 105 may then search the set of descriptor files 140 to determine if a descriptor file exists that indicates that its associated service takes a customer ID as input and returns a customer name and address as output.

As seen in FIG. 1, data quality tool 105 includes a processor 160 and a memory 165. This disclosure contemplates processor 160 and memory 165 being configured to perform any of the functions of data quality tool 105 described herein. Generally, data quality tool 105 implements machine learning trainer 155, descriptor generator 160, and service locator 165.

Machine learning trainer 155 trains a machine learning policy using the source code and the metadata of a subset of services of the set of services 130. Machine learning trainer 155 trains the machine learning policy such that it can be applied to a service of the set of services 130 to determine a descriptor file 140 assigned to the service. In certain embodiments, training the machine learning policy includes using a natural language processor to parse each source code file and each piece of metadata of the subset of services to identify potential language in the source code files and/or the metadata that may be associated with input parameters and/or output parameters of the service. As an example, various source code files may refer to a customer name using any number of different variable names. A few examples include "name," "customerName," "identity," "customer," "user," or any other possible variable name. The machine learning trainer 155 may implement a natural language processor to determine that these variable names likely refer to an output parameter for a service.

In certain embodiments, after identifying potential input and output parameter language, machine learning trainer 155 then implements a classification algorithm to classify the potential input and output parameter language into a set of input types and output types. For example, the classification component of the machine learning trainer 155 may determine that each of the variable names, "name," "customerName," "identity," "customer," and "user" are variously used to represent outputs that correspond to a name that consists of a string that includes one or more blank spaces. Accordingly, the classification component of the machine learning trainer 155 may assign these variable names to a "fullName" output type. Thus, machine learning trainer 155 trains the machine learning policy such that when it is applied to a service that contains any of the variable names, "name," "customerName," "identity," "customer," or "user," the machine learning policy includes the output type "fullName" in the associated descriptor file 140.

In certain embodiments, the natural language processor and/or the classification algorithm are trained in part using input from a system administrator. For example, in certain embodiments a system administrator may identify input and output language in a second subset of the subset of services 130 and train the natural language processor component of the machine learning trainer 155 in part using this identified input and output language. As another example, a system administrator may assign a subset of the identified input and output language to the set of input types and output types and train the classification component of the machine learning trainer 155 in part using these assignments.

Machine learning trainer 155 may be a software module stored in memory 150 and executed by processor 145. An example algorithm for machine learning trainer 155 is as follows: access a subset of services of the set of services 130; parse the source code files and the metadata associated with the subset of services of the set of services 130 using a natural language processor; identify potential language in the source code files and the metadata that may correspond to input and/or output parameters; associate each potential output parameter language of the set of potential output parameter language with an output type; and associate each potential input parameter language of the set of potential input parameter language with an input type.

Descriptor generator 160 applies the machine learning policy trained by machine learning trainer 155 to the set of services 130 stored in first database 125 to determine the set of descriptor files 140. Descriptor generator 160 determines a descriptor file for each service of the set of services 130. Each descriptor file contains the input types and the output types associated with the service. For example, a descriptor file for a service consisting of a customer data structure may indicate that the service takes a customer ID as input and returns a customer name and an address, formatted as strings, as output. Descriptor generator 160 stores these descriptor files in second database 135, for later access by service locator 165.

In certain embodiments, descriptor generator 160 additionally stores version numbers in descriptor files 140, where a version number stored in a descriptor file is associated with the version of the service assigned to the descriptor file. For example, when descriptor generator 160 initially operates on the set of services 130 to determine the set of descriptor files 140, it may store the input types and output types for each service under a version v1 in the descriptor file. In such embodiments, descriptor generator 160 may further determine that either a source code file or a piece of metadata assigned to a service of the set of services 130 has changed, and that such change results in a change to the input types and/or output types of the service. For example, descriptor generator 160 may determine that in addition to the customer name and address output by a service that consists of a customer data structure, the service additionally produces a country as output. In response to determining that a source code file and/or a piece of metadata assigned to a service has changed, and that such change results in a change to the input types and/or output types of the service, descriptor generator 160 may generate a new set of descriptor file data, which it then stores in the descriptor file initially generated for the service, under a new version number, different from the previous version numbers stored in the descriptor file.

Descriptor generator 160 may be a software module stored in memory 150 and executed by processor 145. An example algorithm for descriptor generator 160 is as follows: for each of the services stored in the set of services 130: {apply the machine learning policy trained by machine learning trainer 155 to determine a descriptor file for the service; store the descriptor file in second database 135}; for each service of the set of services 130: {determine if a source code file and/or a piece of metadata associated with a service stored in first database 125 has changed; if a source code file and/or a piece of metadata stored in first database 125 has changed: {apply the machine learning policy to the service; compare the descriptor file for the service with the new descriptor information generated by the machine learning policy; if the descriptor information has changed: store the new descriptor information under a new version number in the descriptor file.}}

Service locator 165 receives requests 170 from users 110B seeking services stored in first database 125. Requests 170 indicate the types of services that users 110B are looking for. For example, requests 170 may contain the input types and output types of the services sought by users 110B. Service locator 165 then searches through the set of descriptor files 140 stored in second database 135 to determine whether the service user 110B wishes to implement already exists. For example, service locator 165 searches through each descriptor file of the set of descriptor files 140 to determine if a service exists that has the same input types and the same output types as those specified by user 110B in his/her request 170. In certain embodiments, requests 170 may contain only the outputs of the services that users 110B are looking for. In such embodiments, service locator 165 searches through each descriptor file of the set of descriptor files 140 to determine if a service exists that has the same output types as those specified by user 110B in his/her request 170.

In certain embodiments, requests 170 may contain natural language descriptions of the inputs and outputs of the service the user 110B is seeking that are different from the input types and output types stored in the descriptor files 140. In such embodiments, service locator 165 may apply the natural language processor and/or the classification algorithm of the machine learning trainer in order to determine the input types and the output types associated with request 170.

Once service locator 165 has located a descriptor file of the set of descriptor files 140 that satisfies the request 170 from user 110B, service locator 165 then determines to which service of the set of services 130 the descriptor file is assigned. Service locator 165 then sends the service to user 110B, as service response 180. In certain embodiments, sending service response 180 to user 110B includes creating a contract between user 110B and the organization to which user 110A belongs (i.e., the organization that developed the service). Accordingly, service locator 165 additionally sends contract information 175 to user 110A.

In certain embodiments, service locator 165 may determine that no service of the set of services 130 satisfies service request 170. In certain such embodiments, service locator 165 may send a message to user 110B in service response 180 indicating that it was unable to locate a service. In other such embodiments, service locator 165 may send user 110B those descriptor files assigned to services that most closely match the service requested by service request 170. For example, service locator 165 may determine that no descriptor file contains all of the input and output types requested by service request 170, but that a descriptor file contains the input types and two out of three output types requested by service request 170. Accordingly, service locator 165 may send the descriptor file to user 110B. This may be desirable, as user 110B may then contact user 110A and request that the organization to which user 110A belongs implement a new version of the service assigned to the descriptor file that implements the additional requested output type. If the organization does implement this new version of the service for user 110B, this may save user 110B the time and effort required to develop and test the service himself.

In certain embodiments, service locator 165 may locate multiple descriptor files in the set of descriptor files 140 that satisfy service request 170. In such embodiments, service locator 165 may send these descriptor files to user 110B as service response 180 and wait to receive a second service request 170 from user 110B containing a selection of the descriptor file for which user 110B wishes to implement the assigned service. Service locator 165 may then determine to which service of the set of services 130 the selected descriptor file is assigned and send the service to user 110B, as a second service response 180

In certain embodiments in which the descriptor files of the set of descriptor files 140 additionally contain version numbers, service locator searches through each version stored in each descriptor file to determine if a version of a service exists that has the same input and/or output types as the user 110B specified in his/her request 170. In such embodiments, when sending the service assigned to the descriptor file identified by service locator 165 as satisfying the request 170 sent by user 110B, service locator 165 additionally sends the version number of the service to user 110B in service response 180.

Service locator 165 may be a software module stored in memory 150 and executed by processor 145. An example algorithm for service locator 165 is as follows: receive service request 170 from user 110B; determine that service request 170 specifies a set of input types and a set of output types; for each descriptor file of the set of descriptor files 140: {for each version in the descriptor file: compare the input types specified in the descriptor file to the input types specified in service request 170; if the input types specified in the descriptor file match those specified in service request 170: {compare the output types specified in the descriptor file to the output types specified in service request 170; if the output types specified in the descriptor file match those specified in service request 170, determine the service of the set of services 130 assigned to the descriptor file; send the service as a service response 180 to user 110B.}}

Processor 145 is any electronic circuitry, including, but not limited to microprocessors, application specific integrated circuits (ASIC), application specific instruction set processor (ASIP), and/or state machines, that communicatively couples to memory 150 and controls the operation of data structure tool 105. Processor 145 may be 8-bit, 16-bit, 32-bit, 64-bit or of any other suitable architecture. Processor 145 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 145 may include other hardware and software that operates to control and process information. Processor 145 executes software stored on memory to perform any of the functions described herein. Processor 145 controls the operation and administration of data structure tool 105 by processing information received from network 120, device(s) 115, and memory 150. Processor 145 may be a programmable logic device, a microcontroller, a microprocessor, any suitable processing device, or any suitable combination of the preceding. Processor 145 is not limited to a single processing device and may encompass multiple processing devices.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

In certain embodiments, system 100 enables users 110B to access and use services that have undergone thorough testing, without having to develop and test new services themselves from scratch. By implementing existing services developed by other organizations, certain users and/or organizations may conserve valuable development resources.

Figure 2:
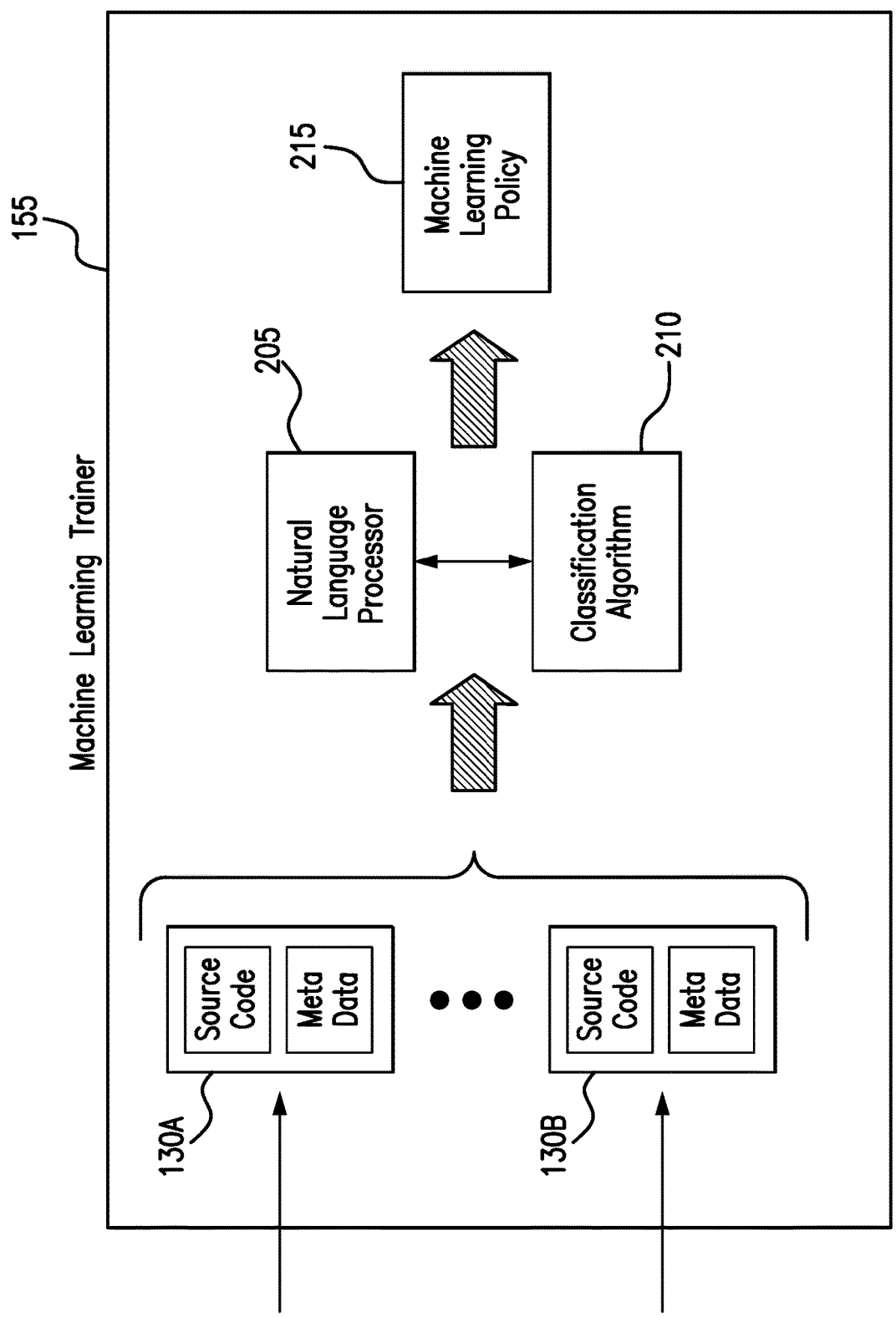
FIG. 2 illustrates the machine learning trainer of the data structure tool in the system of FIG. 1, which trains a machine learning policy to generate a descriptor file when provided with a given service.

FIG. 2 illustrates machine learning trainer 155 of data structure tool 105. Machine learning trainer 155 trains machine learning policy 215 using the source code and metadata of a subset of services of the set of services 130, illustrated here as services 130A through 130B. Machine learning trainer 155 trains machine learning policy 215 such that it can be applied to a service of the set of services 130 to determine a descriptor file 140 assigned to the service. In certain embodiments, training machine learning policy 215 includes using natural language processor 205 to parse each source code file and each piece of metadata of the subset of services 130A through 130B to identify potential language in the source code files and/or the metadata that may be associated with input parameters and/or output parameters of the service. As an example, various source code files may refer to a customer name using any number of different variable names. A few examples include "name," "customerName," "identity," "customer," "user," or any other possible variable name. Machine learning trainer 155 may implement natural language processor 205 to determine that these variable names likely refer to an output parameter for a service. For example, machine learning trainer 155 may implement natural language processor 205 to determine that the probability these variable names refer to an output parameter for a service is greater than a threshold. In certain such embodiments, the threshold is set by a system administrator.

In certain embodiments, after identifying potential input and output parameter language, machine learning trainer 155 further implements classification algorithm 210 to classify the potential input and output parameter language into a set of input types and output types. For example, the classification component 210 of the machine learning trainer 155 may determine that each of the variable names, "name," "customerName," "identity," "customer," and "user" are variously used to represent outputs that correspond to a name that consists of a string that includes one or more blank spaces. Accordingly, classification component 210 of the machine learning trainer 155 may assign these variable names to a "fullName" output type. Thus, machine learning trainer 155 trains the machine learning policy 215 such that when it is applied to a service that contains any of the variable names, "name," "customerName," "identity," "customer," or "user," the machine learning policy 215 includes the output type "fullName" in the associated descriptor file 140.

In certain embodiments, the natural language processor 205 and/or the classification algorithm 210 are trained in part using input from a system administrator. For example, in certain embodiments a system administrator may identify input and output language in a second subset of the subset of services 130 and train the natural language processor component 205 of the machine learning trainer 155 in part using this identified input and output language. As another example, a system administrator may assign a subset of the identified input and output language to the set of input types and output types and train the classification component 210 of the machine learning trainer 155 in part using these assignments.

Figure 3:
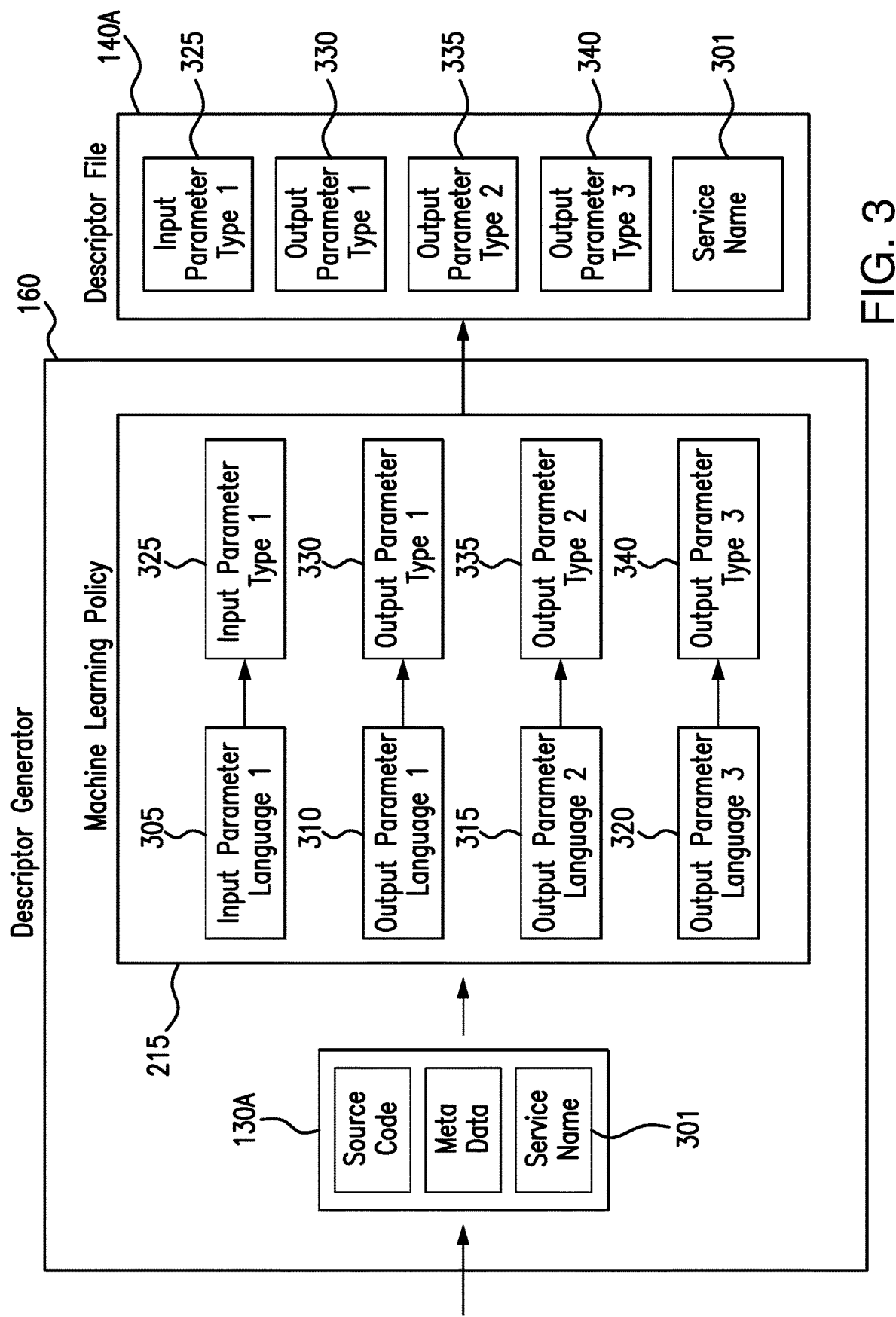
FIG. 3 illustrates the descriptor generator of the data structure tool in the system of FIG. 1, which uses the machine learning policy trained by the machine learning trainer of the data structure tool in the system of FIG. 1 to generate a set of descriptor files.

FIG. 3 illustrates descriptor generator 160 of data structure tool 105. In general, descriptor generator 160 uses machine learning policy 215 to determine a set of descriptor files 140 using the set of services 130. Descriptor generator 160 determines a descriptor file for each service of the set of services 130. For simplicity, FIG. 3 illustrates the operation of descriptor generator 160 using a single service 130A of the set of services 130.

As can be seen, service 130A contains source code and metadata. Service 130A is additionally assigned a service name 301. Descriptor generator 160 applies machine learning policy 215 to service 130A. In certain embodiments, this involves applying natural language processing component 205 of machine learning policy 215 to identify potential input parameter language and potential output parameter language. For example, natural language processing component 205 of machine learning trainer 155 identifies first potential input parameter language 305, first potential output parameter language 310, second potential output parameter language 315, and third potential output parameter language 320. In certain embodiments, machine learning policy 215 has been trained, in part using classification component 210 of machine learning trainer 155, to associate potential input parameter language with input parameter types and to associate potential output parameter language with output parameter types. Accordingly, machine learning policy 215 assigns first potential input parameter language 305 to first input parameter type 325, first potential output parameter language to first output parameter type 330, second potential output parameter language 315 to second output parameter type 335, and third potential output parameter language 320 to third output parameter type 340. As an example, third potential output parameter language 320 may include any of the variable names "customerName," "name," "user," "customer," etc., used in the source code and/or metadata of service 130A for a customer's name.

This set of potential output parameter language may be assigned to output parameter type "fullName" or any other appropriate natural language phrase.

Once machine learning policy 215 has determined the input types and the output types for service 130A, it generates descriptor file 140A for service 130A. Descriptor file 140A contains first input parameter type 325, first output parameter type 330, second output parameter type 335, third output parameter type 340, and the name of the service 310. Descriptor generator 160 then stores descriptor file 140A in second database 135.

In certain embodiments, descriptor generator 160 additionally stores a version number in descriptor file 140A, where the version number corresponds to a version of the service that is assigned to the descriptor file. This disclosure contemplates that any number of versions of a service may be stored in the descriptor file for the service.

In embodiments in which descriptor generator 160 additionally stores a version number in descriptor file 140A, descriptor generator 160 may initially store the input types 325 and output types 330 through 340 for the service under a version v1 in descriptor file 140A, when descriptor generator 160 initially operates on service 130A. In such embodiments, descriptor generator 160 may further determine that either a source code file or a piece of metadata assigned to service 130A has changed, and that such change results in a change to the input type 325 and/or output types 330 through 340 of service 130A. For example, descriptor generator 160 may determine that in addition to first output type 330, second output type 335, and third output type 340, service 130A additionally generates a fourth output parameter assigned to a fourth output parameter type. In response to determining that a source code file and/or a piece of metadata assigned to a service has changed, and that such change results in a change to the input types and/or output types of the service, descriptor generator 160 may generate a new set of descriptor file data, which it then stores in descriptor file 130A, under a new version number, different from the previous version numbers stored in the descriptor file. In this manner, descriptor files 140 may be used to keep track of the different versions of services 130 that are available, such that a user 110B may access a previous version of a service 130A, rather than simply the current version of service 130A, if the previous version better suits the user's needs.

Figure 4:
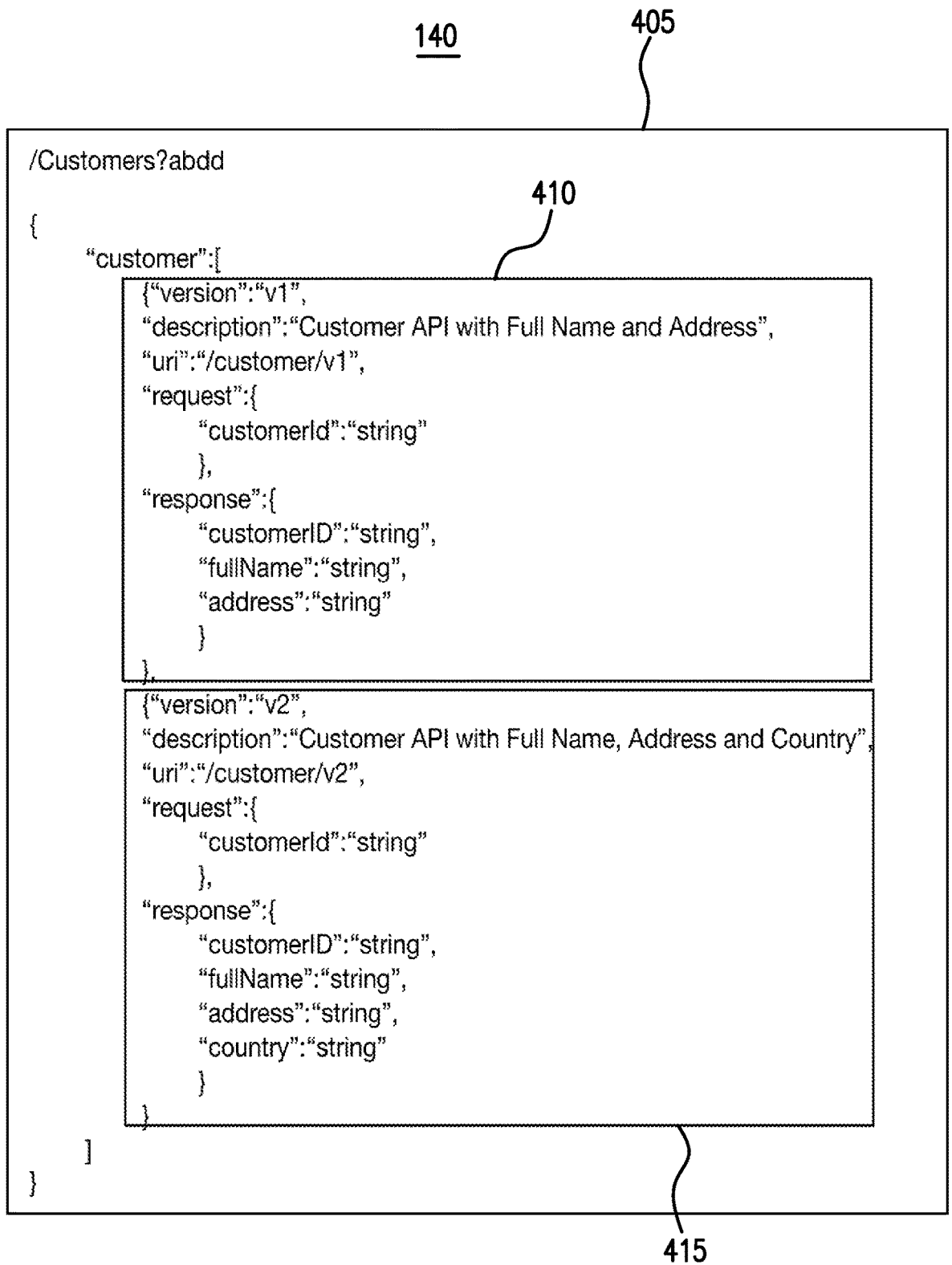
FIG. 4 presents an example descriptor file generated by the data structure tool in the system of FIG. 1.

FIG. 4 presents an example descriptor file 405, generated by data structure tool 105. In this example, descriptor file 405 is assigned to a customer service. As can be seen, descriptor information for a first version, v1, of the service is stored in section 410 of the file, while descriptor information for a second version, v2, of the service is stored in section 415 of the file. First version, v1, of the customer service receives customerID as input, produces customerID, fullName, and address, all formatted as strings, as outputs. Second version, v2, of the customer service also receives customerID as input, and produces country as output, in addition to producing customerID, fullName, and address as outputs. While FIG. 4 presents one particular example format for a descriptor file 405, this disclosure contemplates that any format may be used for descriptor file 405, provided descriptor file 405 specifies the input types and output types for its associated service.

Figure 5:
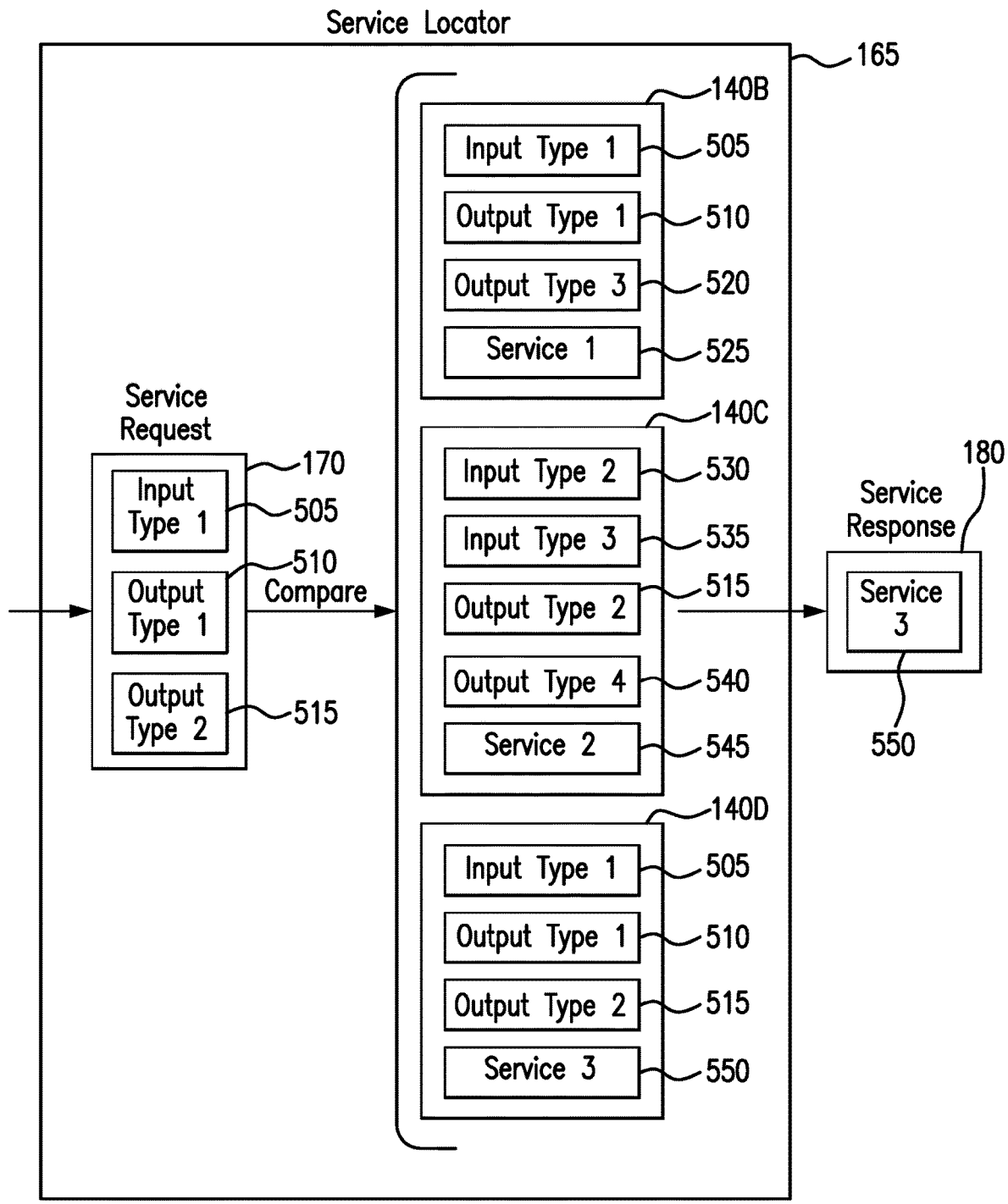
FIG. 5 illustrates the service locator of the data structure tool in the system of FIG. 1, which uses the descriptor files generated by the descriptor generator of the data structure tool in the system of FIG. 1 to locate a service requested by a user.

FIG. 5 illustrates service locator 165 of data structure tool 105. Service locator 165 receives requests 170 from users 110B seeking services stored in first database 125. Requests 170 indicate the types of services that users 110B are seeking. For example, request 170 may contain first input type 505, first output type 510, and second output type 515. Service locator 165 searches through the set of descriptor files 140 stored in second database 135 to determine whether the service a user 110B wishes to implement already exists. Service locator 165 determines whether the service user 110B wishes to implement already exists, by comparing the input types and output types of service request 170 to the input types and output types contained in descriptor files 140. For example, service locator 165 compares first input type 505 to the input types stored in descriptor file 140B assigned to first service 525, descriptor file 140C assigned to second service 545, and descriptor file 140D assigned to third service 550. Additionally, service locator 165 compares first output type 510 and second output type 515 to the output types stored in descriptor file 140B assigned to first service 525, descriptor file 140C assigned to second service 545, and descriptor file 140D assigned to third service 550. Here, service locator 165 determines that descriptor file 140D contains the same input type 505 and output types 510 and 515 as service request 170. Service locator 165 determines that descriptor file 140D is assigned to third service 550 and accordingly, service locator 165 sends third service 550 to user 110B as service response 180. Here, for simplicity, three services from the set of services 130 were presented; however, this disclosure contemplates that any number of services may be stored in the set of services 130.

In certain embodiments, requests 170 may contain natural language descriptions of the inputs and outputs of the service user 110B is seeking, which are different from the input types and output types stored in the descriptor files 140. In such embodiments, service locator 165 may apply the natural language processor 205 and/or the classification algorithm 210 of the machine learning policy 215 in order to determine the input types and the output types associated with request 170.

In certain embodiments, sending service response 180 to user 110B includes creating a contract between user 110B and the organization to which user 110A belongs (i.e., the organization that developed third service 550). Accordingly, service locator 165 additionally sends contract information 175 to user 110A.

In certain embodiments, service locator 165 may determine that no service of the set of services 130 satisfies service request 170. In certain such embodiments, service locator 165 may send a message to user 110B in service response 180 indicating that it was unable to locate a service. In other such embodiments, service locator 165 may send user 110B those descriptor files assigned to services that most closely match the service requested by service request 170. For example, service locator 165 may determine that no descriptor file contains all of the input and output types requested by service request 170, but that a descriptor file contains the input types and one of the two output types requested by service request 170. Accordingly, service locator 165 may send the descriptor file to user 110B. This may be desirable, as user 110B may then contact user 110A and request that the organization to which user 110A belongs implement a new version of the service assigned to the descriptor file that implements the additional requested output type. If the organization does implement this new version of the service for user 110B, this may save user 110B the time and effort required to develop and test the service himself.

In certain embodiments, service locator 165 may locate multiple descriptor files in the set of descriptor files 140 that satisfy service request 170. In such embodiments, service locator 165 may send these descriptor files to user 110B as service response 180 and wait to receive a second service request 170 from user 110B containing a selection of the descriptor file for which user 110B wishes to implement the associated service. Service locator 165 may then determine to which service of the set of services 130 the selected descriptor file is assigned and send the service to user 110B, as a second service response 180

In certain embodiments in which the descriptor files of the set of descriptor files 140 additionally contain version numbers, service locator searches through each version stored in each descriptor file to determine if a version of a service exists that has the same input and/or output types as the user 110B specified in his/her request 170. In such embodiments, when sending the service assigned to the descriptor file identified by service locator 165 as satisfying the request 170 sent by user 110B, service locator 165 additionally sends the version number of the service to user 110B in service response 180.

Figure 6:
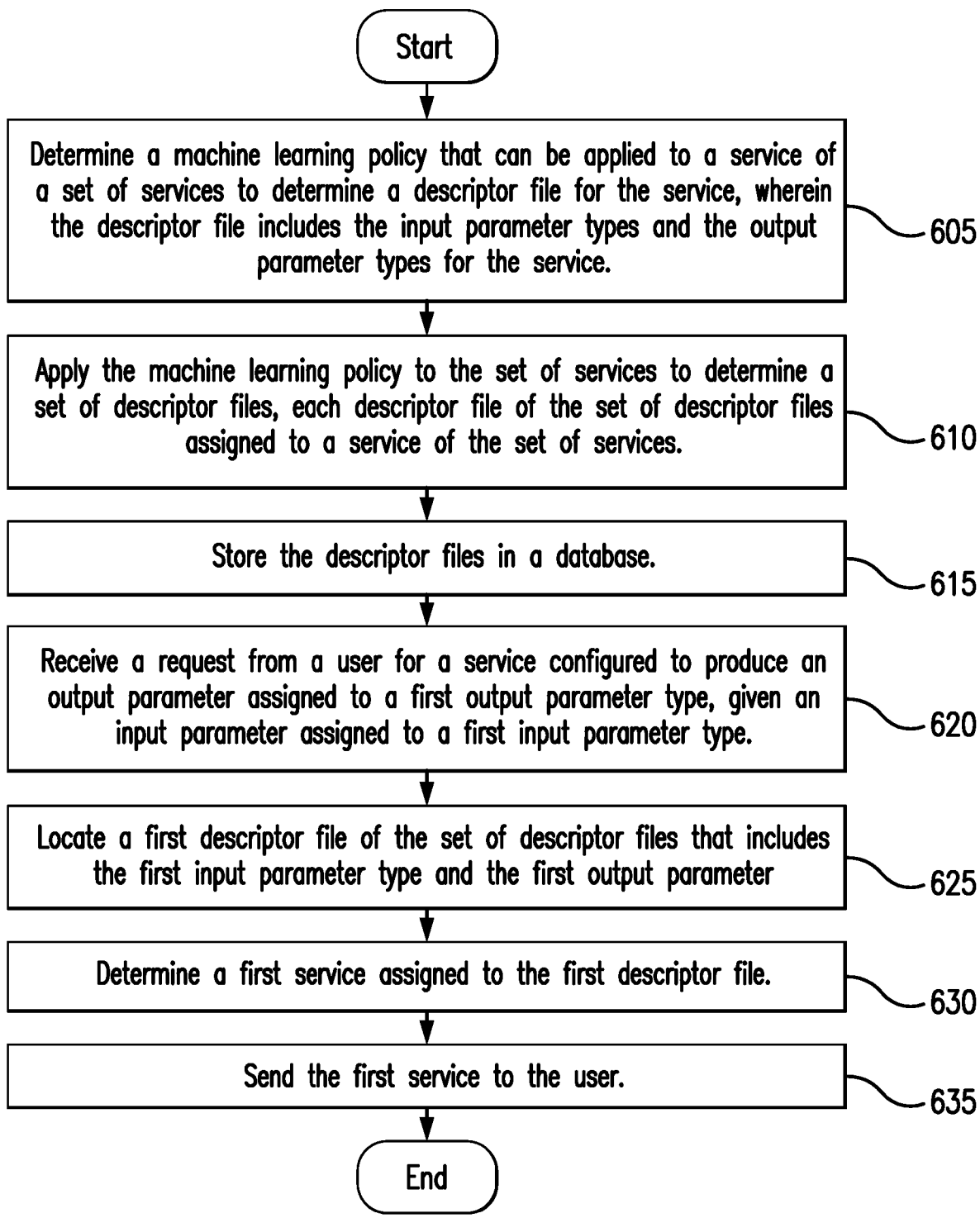
FIG. 6 presents a flowchart illustrating the process by which the data structure tool of the system in FIG. 1 generates descriptor files and uses the descriptor files to respond to user requests for services.

FIG. 6 presents a flowchart illustrating the process by which data structure tool 105 generates descriptor files and uses the descriptor files to respond to user requests for services. In step 605, the tool determines a machine learning policy 215 that can be applied to a service of the set of services 130 to determine a descriptor file for the service.

The descriptor file will include the input parameter types and the output parameter types for the service.

In certain embodiments, training machine learning policy 215 includes using a natural language processor to parse each source code file and each piece of metadata of the subset of services to identify potential language in the source code files and/or the metadata that may be associated with input parameters and/or output parameters of the service. As an example, various source code files may refer to a customer name using any number of variable names. A few examples include "name," "customerName," "identity," "customer," "user," or any other possible variable name. The machine learning trainer 155 may implement a natural language processor to determine that these variable names all likely refer to an output parameter for a service. For example, the natural language processor may determine that the probability that these variable names refer to an output parameter for a service is greater than a threshold. In certain such embodiments, the threshold is set by a system administrator.

In certain embodiments, after identifying potential input and output parameter language, machine learning trainer 155 then implements a classification algorithm to classify the potential input and output parameter language into a set of input types and output types. For example, the classification component of the machine learning trainer 155 may determine that each of the variable names, "name," "customerName," "identity," "customer," and "user" are variously used to represent outputs that correspond to a name that consists of a string that includes one or more blank spaces. Accordingly, the classification component of the machine learning trainer 155 may assign these variable names to a "fullName" output type. Thus, machine learning trainer 155 trains machine learning policy 215 such that when it is applied to a service that contains any of the variable names, "name," "customerName," "identity," "customer," or "user," the machine learning policy includes the output type "fullName" in the associated descriptor file 140.

In step 610, the tool applies machine learning policy 215 to the set of services 130 to determine a set of descriptor files 140, each descriptor file of the set of descriptor files 140 assigned to a service of the set of services 130. In step 615, the tool stores the descriptor files in database 135. In step 620, the tool receives a request from a user for a service configured to produce an output parameter assigned to a first output parameter type, given an input parameter assigned to a first input parameter type. In step 625, the tool locates a first descriptor file of the set of descriptor files 140 that includes the first input parameter type and the first output parameter type. Next, in step 630, the tool determines a first service assigned to the first descriptor file. Finally, in step 635, the tool sends the first service to user 110B as service response 180. In certain embodiments, sending service response 180 to user 110B includes creating a contract between user 110B and the organization to which user 110A belongs (i.e., the organization that developed the service). Accordingly, in such embodiments, in step 635 the tool additionally sends contract information 175 to user 110A.

Modifications, additions, or omissions may be made to method 600 depicted in FIG. 6. Method 600 may include more, fewer, or other steps. For example, steps may be performed in parallel or in any suitable order. While discussed as data quality tool 105 (or components thereof) performing the steps, any suitable component of system 100, such as device(s) 115 for example, may perform one or more steps of the method.

Figure 7:
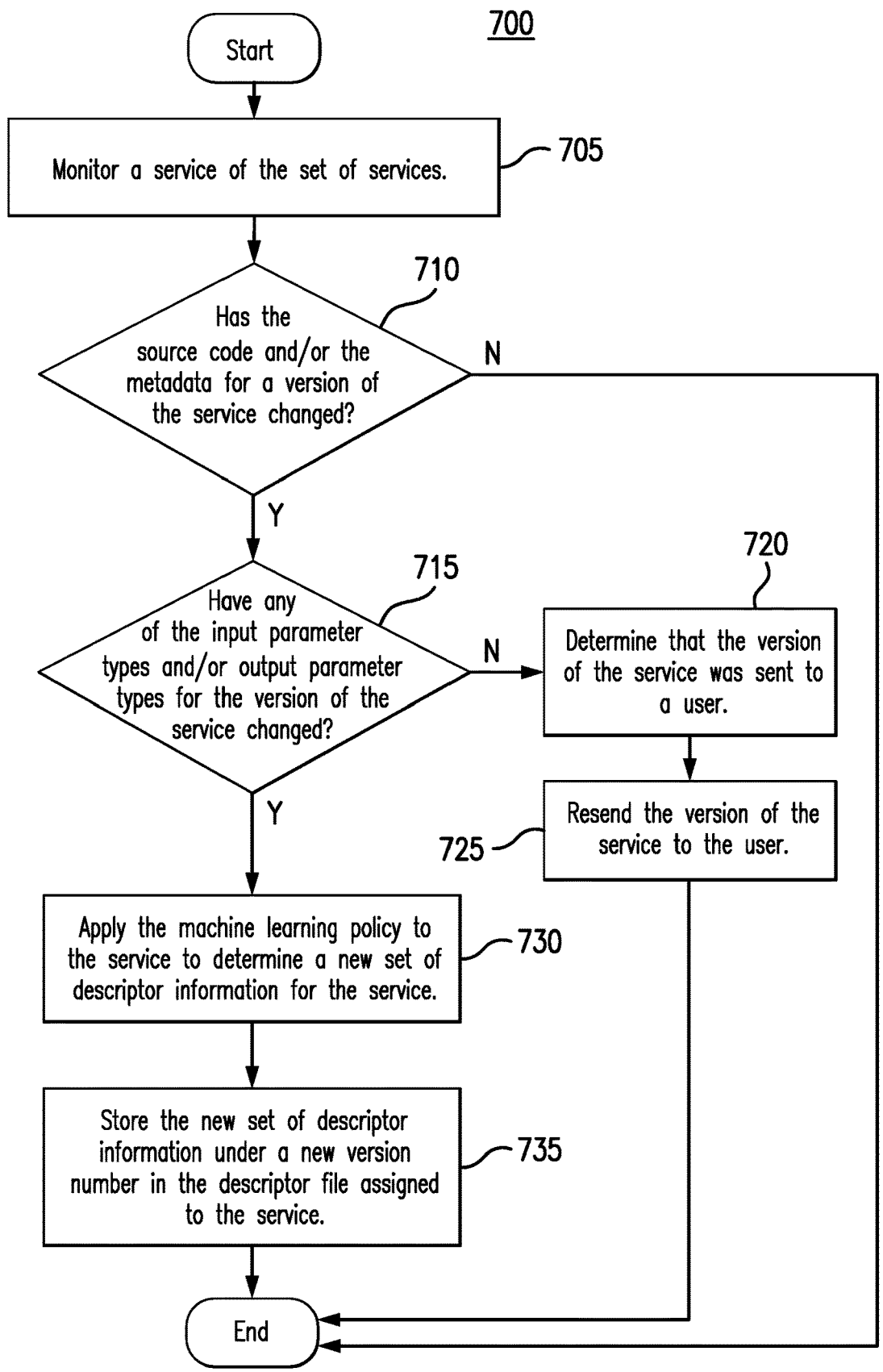
FIG. 7 presents a flowchart illustrating the process by which the data structure tool of the system in FIG. 1 stores information about different versions of services in the descriptor files and delivers updates of particular versions of services to those users using those particular versions of services.

FIG. 7 presents a flowchart illustrating the process by which certain embodiments of the data structure tool of the system in FIG. 1 store information about different versions of services in the descriptor files and deliver updates of particular versions of services to those users using those particular versions of services. In step 705, the tool monitors a service of the set of services 130 stored in database 125. In step 710, the tool determines whether the source code and/or the metadata for a version of the service has changed. If the tool determines that the source code and/or the metadata for a version of the service has changed, in step 715, the tool determines whether any of the input parameter types and/or output parameter types for that version of the service have changed. If the tool determines that any of the input parameter types and/or output parameter types have changed in step 715, in step 730, the tool applies machine learning policy 215 to the service to determine a new set of descriptor information for the service. In step 735, the tool stores the new set of descriptor information under a new version number in the descriptor file assigned to the service.

If, in step 715, the tool determines that while the source code and/or the metadata for a version of the service has changed, none of the input parameter types and output parameter types for that version of the service have changed, in step 720, the tool determines whether that version of the service was sent to a user. Finally, in step 725, if the tool determines that that version of the service was sent to a user, the tool resends that version of the service to the user.

Modifications, additions, or omissions may be made to method 700 depicted in FIG. 7. Method 700 may include more, fewer, or other steps. For example, steps may be performed in parallel or in any suitable order. While discussed as data quality tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. An apparatus comprising:
a first database configured to store a set of services, each service of the set of services:
corresponding to at least one of a data structure and an application programming interface, the at least one of the data structure and the application programming interface comprising a source code file and a piece of metadata, the source code file and the piece of metadata defining a set of input parameters and a set of output parameters associated with the service; and
configured to produce the set of output parameters in response to receiving the set of input parameters;
a second database;
a memory configured to store a machine learning algorithm trained, based on a subset of the set of services, to generate, when applied to a given service of the set of services, a descriptor file assigned to the given service, wherein:
applying the trained machine learning algorithm to the given service comprises:

determining, for each output parameter of the set of output parameters associated with the given service, an output parameter type assigned to the output parameter;

determining, for each input parameter of the set of input parameters associated with the given service, an input parameter type assigned to the input parameter; and the descriptor file comprises:
for each output parameter of the set of output parameters associated with the given service, the assigned output parameter type; and
for each input parameter of the set of input parameters associated with the given service, the assigned input parameter type; and a hardware processor configured to:
apply the machine learning algorithm to the set of services to generate a set of descriptor files, each descriptor file of the set of descriptor files assigned to a service of the set of services;
store the set of descriptor files in the second database;
receive a request from a user seeking any service of the set of services that is configured to produce a particular output parameter assigned to a particular output type, given a particular input parameter assigned to a particular input type;
in response to receiving the request from the user:
locate a particular descriptor file of the set of descriptor files comprising the particular output type and the particular input type;
identify the service assigned to the particular descriptor file; and
send the service assigned to the particular descriptor file to the user.

2. The apparatus of claim 1, wherein:
each descriptor file of the set of descriptor files further comprises a version number; and
the processor is further configured to:
determine that at least one of the set of input parameters and the set of output parameters associated with a first service of the set of services have changed, based on at least one of a change to the source code file and a change to the piece of metadata of the first service, the first service assigned to a first descriptor file, the first descriptor file comprising a first version number;
in response to determining that at least one of the set of input parameters the set of output parameters associated with the first service have changed:
apply the machine learning algorithm to the first service to generate a new descriptor file comprising a new set of descriptor information; and
store the new set of descriptor information in the first descriptor file under a new version number different from the first version number.

3. The apparatus of claim 2, wherein:
the new descriptor information comprises a first output parameter type and a first input parameter type; and
the processor is further configured to:
receive a second request from the user seeking any service of the set of services that is configured to produce a first output parameter assigned to the first output parameter type, given a first input parameter assigned to the first input type;
locate the first descriptor file of the set of descriptor files comprising the first output parameter type and the first input parameter type, the first output parameter type and the fifth first input parameter type located below the second version number;
identify the first service assigned to the first descriptor file; and
send a second version of the first service to the user, the second version of the first service assigned to the second version number.

4. The apparatus of claim 1, wherein the processor is further configured to:
determine that the set of input parameters and the set of output parameters associated with a first service of the set of services have not changed and that at least one of the source code file and the piece of metadata of the first service have changed; and
in response to determining that the set of input parameters and the set of output parameters associated with the first service have not changed and that at least one of the source code file and the piece of metadata of the first service have changed:
determine that the first service was sent to a second user; and
in response to determining that the first service was sent to the second user:
resend the first service to the second user.

5. The apparatus of claim 1, wherein:
the processor is further configured to train the machine learning algorithm; and
training the machine learning algorithm comprises implementing a natural language processor to parse each source code file and each piece of metadata of the subset of the set of services to identify potential input parameter language and potential output parameter language.

6. The apparatus of claim 1, wherein the machine learning algorithm is a machine learning classification algorithm trained to classify the potential input parameter language into a set of input types and to classify the potential output parameter language into a set of output types.

7. The apparatus of claim 1, wherein each service of the set of services is assigned to a producer and sending a given service of the set of services to the user comprises creating a contract between the user and the producer assigned to the given service.

8. A method comprising:
training a machine learning algorithm, based on a first subset of a set of services, to generate, when applies to a given service of the set of services a descriptor file assigned to the given service, wherein:
each service of the set of services:
corresponds to at least one of a data structure and an application programming interface, the at least one of the data structure and the application programming interface comprising a source code file and a piece of metadata, the source code file and the piece of metadata defining a set of input parameters and a set of output parameters associated with the service; and
is configured to produce the set of output parameters in response to receiving the set of input parameters;
applying the trained machine learning algorithm to the given service comprises:
determining, for each output parameter of the set of output parameters associated with the given service, an output parameter type assigned to the output parameter; and determining, for each input parameter of the set of input parameters associated with the given service, an input parameter type assigned to the input parameter; and the descriptor file comprises:
for each output parameter of the set of output parameters associated with the given service, the assigned output parameter type; and
for each input parameter of the set of input parameters associated with the given service, the assigned input parameter type;

applying the machine learning algorithm to the set of services to generate a set of descriptor files, each descriptor file of the set of descriptor files assigned to a service of the set of services;

storing the set of descriptor files in a database;

receiving a request from a user seeking any service of the set of services that is configured to produce a particular output parameter assigned to a particular output type, given a particular input parameter assigned to a particular input type;

in response to receiving the request from the user:
locating a particular descriptor file of the set of descriptor files comprising the particular output type and the particular input type;
identifying the service assigned to the particular descriptor file; and
sending the service assigned to the particular descriptor file to the user.

9. The method of claim 8, wherein:
each descriptor file of the set of descriptor files further comprises a version number; and
the method further comprises:
determining that at least one of the set of input parameters and the set of output parameters associated with a first service of the set of services have changed, based on at least one of a change to the source code file and a change to the piece of metadata of the first service, the first service assigned to a first descriptor file, the first descriptor file comprising a first version number;
in response to determining that at least one of the set of input parameters the set of output parameters associated with the first service have changed:
applying the machine learning algorithm to the first service to generate a new descriptor file comprising a new set of descriptor information; and
storing the new set of descriptor information in the first descriptor file under a new version number different from the first version number.

10. The method of claim 9, wherein:
the new descriptor information comprises a first output parameter type and a first input parameter type; and
the method further comprises:
receiving a second request from the user seeking any service of the set of services that is configured to produce a first output parameter assigned to the first output parameter type, given a first input parameter assigned to the first input type;
locating the first descriptor file of the set of descriptor files comprising the first output parameter type and the first input parameter type, the first output parameter type and the first input parameter type located below the second version number;
identifying the first service assigned to the first descriptor file; and sending a second version of the first service to the user, the second version of the first service assigned to the second version number.

11. The method of claim 8, further comprising:
determining that the set of input parameters and the set of output parameters associated with a first service of the set of services have not changed and that at least one of the source code file and the piece of metadata of the first service have changed; and
in response to determining that the set of input parameters and the set of output parameters associated with the first service have not changed and that at least one of the source code file and the piece of metadata of the first service have changed:
determining that the first service was sent to a second user; and
in response to determining that the first service was sent to the second user:
resending the first service to the second user.

12. The method of claim 8, wherein training the machine learning policy further comprises implementing a natural language processor to parse each source code file and each piece of metadata of the subset of the set of services to identify potential input parameter language and potential output parameter language.

13. The method of claim 8, wherein the machine learning algorithm is a machine learning classification algorithm trained to classify the potential input parameter language into a set of input types and to classify the potential output parameter language into a set of output types.

14. The method of claim 8, wherein each service of the set of services is assigned to a producer and sending a given service of the set of services to the user comprises creating a contract between the user and the producer assigned to the given service.

15. A system comprising:
a first storage element operable to store a set of services, each service of the set of services:
corresponding to at least one of a data structure and an application programming interface, the at least one of the data structure and the application programming interface comprising a source code file and a piece of metadata, the source code file and the piece of metadata defining a set of input parameters and a set of output parameters associated with the service; and
configured to produce the set of output parameters in response to receiving the set of input parameters; and
assigned to a producer;
a second storage element;
a memory element configured to store a machine learning algorithm trained, based on a subset of the set of services, to generate, when applied to a given service of the set of services, a descriptor file assigned to the given service, wherein:
applying the trained machine learning algorithm to the given service comprises:
determining, for each output parameter of the set of output parameters associated with the given service, an output parameter type assigned to the output parameter;
determining, for each input parameter of the set of input parameters associated with the given service, an input parameter type assigned to the input parameter; and
the descriptor file comprises:

for each output parameter of the set of output parameters associated with the given service, the assigned output parameter type; and for each input parameter of the set of input parameters associated with the given service, the assigned input parameter type; and a processing element operable to:

apply the machine learning algorithm to the set of services to generate a set of descriptor files, each descriptor file of the set of descriptor files assigned to a service of the set of services;

store the set of descriptor files in the second storage element;

receive a request from a user seeking any service of the set of services that is configured to produce a particular output parameter assigned to a particular output type, given a particular input parameter assigned to a particular input type;

in response to receiving the request for the user:

locate a particular descriptor file of the set of descriptor files comprising the particular output type and the particular input type;

identify the service assigned to the particular descriptor file; and send the service assigned to the particular descriptor file to the user, wherein sending the service assigned to the particular descriptor file to the user comprises creating a contract between the user and a first producer assigned to the service assigned to the particular descriptor file.

16. The system of claim 15, wherein:

each descriptor file of the set of descriptor files further comprises a version number; and the processing element is further operable to:

determine that at least one of the set of input parameters and the set of output parameters associated with a first service of the set of services have changed, based on at least one of a change to the source code file and a change to the piece of metadata of the first service, the first service assigned to a first descriptor file, the first descriptor file comprising a first version number;

in response to determining that at least one of the set of input parameters the set of output parameters associated with the first service have changed:

apply the machine learning algorithm to the first service to generate a new descriptor file comprising a new set of descriptor information; and store the new set of descriptor information in the first descriptor file under a new version number different from the first version number.

17. The system of claim 16, wherein:

the new descriptor information comprises a first output parameter type and a first input parameter type; and the processing element is further operable to:

receive a second request from the user seeking any service of the set of services that is configured to produce a first output parameter assigned to the first output parameter type, given a first input parameter assigned to the first input type;

locate the first descriptor file of the set of descriptor files comprising the first output parameter type and the first input parameter type, the first output parameter type and the first input parameter type located below the second version number;

identify the first service assigned to the first descriptor file; and send a second version of the first service to the user, the second version of the first service assigned to the second version number.

18. The system of claim 15, wherein the processing element is further operable to:

determine that the set of input parameters and the set of output parameters associated with a first service of the set of services have not changed and that at least one of the source code file and the piece of metadata of the first service have changed; and in response to determining that the set of input parameters and the set of output parameters associated with the first service have not changed and that at least one of the source code file and the piece of metadata of the first service have changed:

determine that the first service was sent to a second user; and in response to determining that the first service was sent to the second user:

resend the first service to the second user.

19. The system of claim 15, wherein:

the processing element is further operable to train the machine learning algorithm; and training the machine learning algorithm comprises implementing a natural language processor to parse each source code file and each piece of metadata of the subset of the set of services to identify potential input parameter language and potential output parameter language.

20. The system of claim 15, wherein the machine learning algorithm is a machine learning classification algorithm trained to classify the potential input parameter language into a set of input types and to classify the potential output parameter language into a set of output types.

* * * * *